(No Model.)

E. GALLAWAY.
SUPPORT FOR CARRIAGE TOPS.

No. 594,943. Patented Dec. 7, 1897.

WITNESSES
C. E. Hunt,
A. M. Poyston

INVENTOR
Edgar Gallaway,
By John Wedderburn
Attorney

UNITED STATES PATENT OFFICE.

EDGAR GALLAWAY, OF MARIETTA, TEXAS, ASSIGNOR OF ONE-HALF TO J. C. MARTIN, OF NAPLES, TEXAS.

SUPPORT FOR CARRIAGE-TOPS.

SPECIFICATION forming part of Letters Patent No. 594,943, dated December 7, 1897.

Application filed February 2, 1897. Serial No. 621,606. (No model.)

*To all whom it may concern:*

Be it known that I, EDGAR GALLAWAY, a citizen of the United States, residing at Marietta, in the county of Cass and State of Texas, have invented certain new and useful Improvements in Supports for Carriage-Tops; and I do hereby declare the following to be a full, clear, and exact description of the invention, such as will enable others skilled in the art to which it appertains to make and use the same.

This invention has reference to a novel construction in a support for carriage-tops, and is designed more especially for use in connection with buggies and similar vehicles wherein the top falls and rests upon the shifting rail or arm extending from the body of the vehicle.

The invention consists in the features of construction hereinafter more particularly set forth and specifically claimed.

Figure 1:
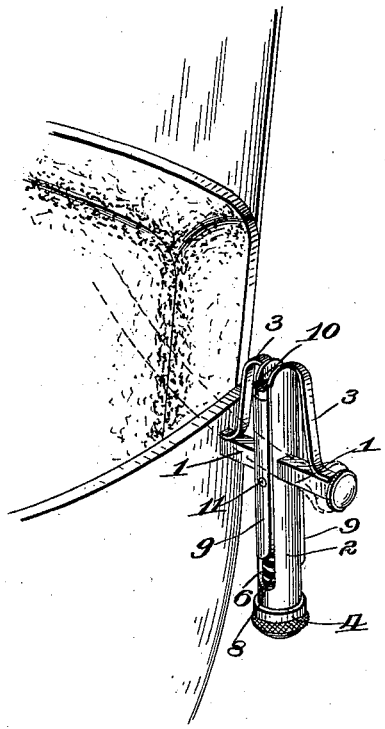
Figure 2:
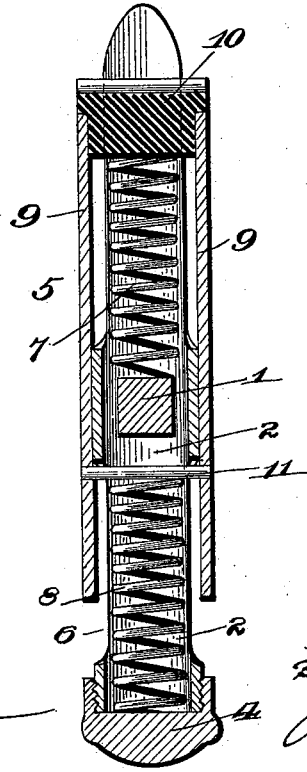

In the accompanying drawings, forming a part of this specification, Figure 1 is a perspective view through a portion of a vehicle provided with this improvement, and Fig. 2 is a vertical section of the same in detail.

Referring now to said drawings, 1 indicates the shifting rail of a vehicle, upon which is mounted an upright tube 2. This tube is provided with an opening through which the shifting rail extends in a manner shown, it being noted that the tube is provided with side wings or braces 3, which rest upon the top of the shifting rail and serve to give a firm support. It is seen, therefore, that said device can be placed with ease upon the shifting rail on either side of the vehicle, since it is reversible. Said tube 2 is provided at its lower end with a screw-threaded cap 4. The upper end of the tube is slotted at both front and rear and above and below the shifting rail 1, as shown at 5 and 6, and situated within the tube 2 are two springs 7 and 8. The spring 7 rests upon the shifting rail, while its upper end normally extends near the upper end of the tube, while the lower spring 8 rests upon the screw-cap 4. The yoke or slide 9 is provided at its upper end with a flexible cap 10 and rests upon the upper spring 7, while the transverse bolt or pin 11 extends between the sides of this yoke 9 and rests upon the upper end of the spring 8. A rubber cap 10 is situated in position to receive the bow of the vehicle-top, and it is seen, therefore, that when the top is folded and thrown to the rear in the first place it is received by a flexible support which prevents the jarring of the same, and, furthermore, that while it is resting in this folded position it is held by this flexible support, which prevents the continuous jarring that usually occurs when the bow rests upon a rigid shifting rail. Heretofore parts have been damaged and injured owing to the continuous jarring and jolting which is thereby occasioned, which will be seen is entirely obviated by the use of this invention.

Having thus described my invention, what I claim as new, and desire to secure by Letters Patent, is—

1. A support of the kind specified consisting of a tube or socket having a spring, longitudinal slots in said tube or socket, a movable yoke secured to said tube or socket and having side pieces situated opposite said slots, and a transverse pin extending between said side pieces and through said slots and resting upon said springs.

2. A holder of the kind specified consisting of a tube or socket having upper and lower springs, supports for said springs rigid with said tube or socket, slots in the upper and lower end portions of said tube or socket, a yoke or slide embracing said tube or socket and resting upon the upper of said springs and a bolt or pin secured to the side of said yoke or slide and extending through the lower of said slots and resting upon the lower of said springs.

3. The combination with the shifting rail of a vehicle-body, of a tube or socket having an opening to receive the same and side wings or braces resting upon said shifting rail, springs situated within said tube or socket, and a movable yoke or slide carried by said tube or socket and bearing upon said springs and provided at its upper end with a flexible cap.

In testimony whereof I have signed this specification in the presence of two subscribing witnesses.

EDGAR GALLAWAY.

Witnesses:
   E. R. WOOD,
   JULIA WOOD.